March 21, 1950     H. G. VALENTINE     2,501,425
FISHHOOK HOLDER
Filed Aug. 13, 1947     2 Sheets-Sheet 1
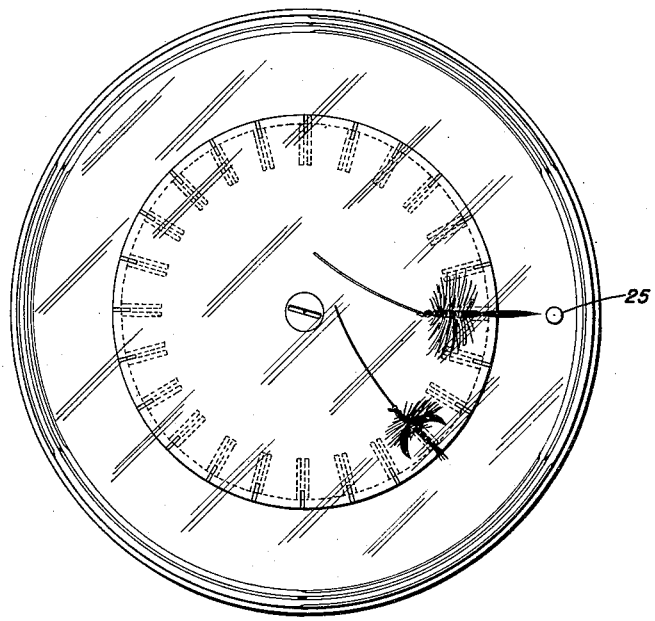
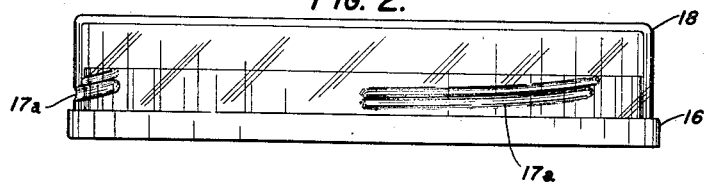
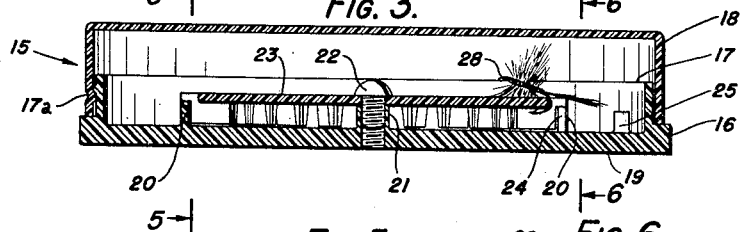
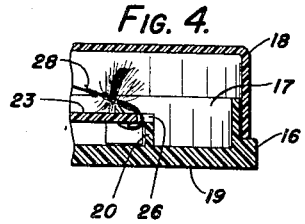 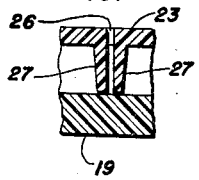 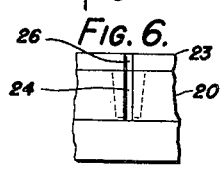
INVENTOR.
HAROLD G. VALENTINE
BY
HIS ATTORNEY March 21, 1950     H. G. VALENTINE     2,501,425
FISHHOOK HOLDER
Filed Aug. 13, 1947     2 Sheets-Sheet 2
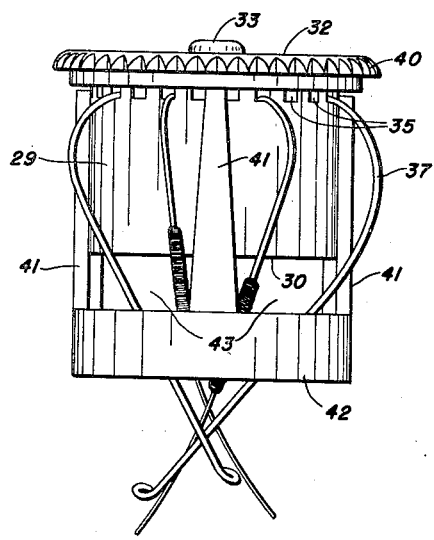
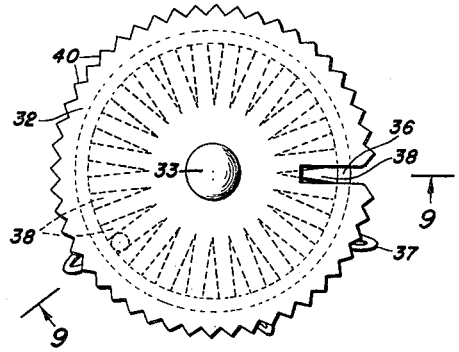
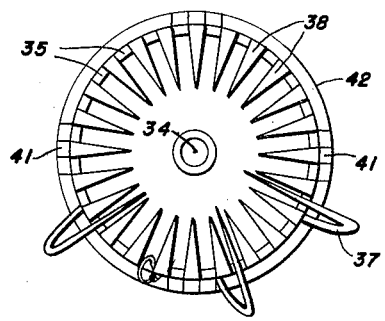
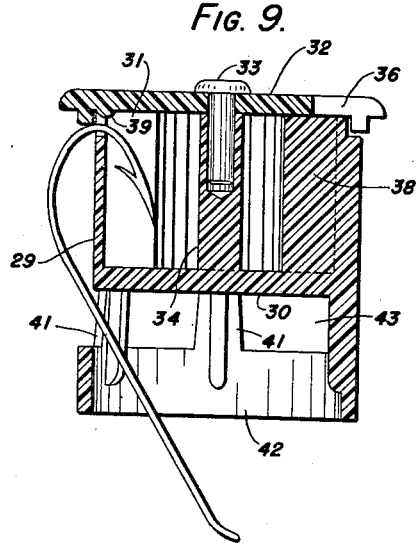
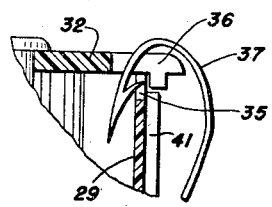
INVENTOR.
HAROLD G. VALENTINE
BY
HIS ATTORNEY Patented Mar. 21, 1950

2,501,425

UNITED STATES PATENT OFFICE 2,501,425

FISHHOOK HOLDER

Harold G. Valentine, Lockport, N. Y., assignor to Norton Laboratories, Inc., Lockport, N. Y., a corporation of Maine Application August 13, 1947, Serial No. 768,338

8 Claims. (Cl. 43—57.5)

1

This invention relates to fish hook holding devices and, more particularly, to the variety for holding an assortment of hooks in individually spaced arrangement for convenient selection and use, one object of the invention being to provide an improved holder of the above character having a more simple, practical and efficient type of construction.

Another object is to provide such a holder with a convenient arrangement of parts capable of being easily and quickly manipulated for selecting and removing a hook therefrom and returning a hook thereto.

A further object is to provide a holder of the above nature comprising conveniently adjustable parts for selecting and removing a desired hook individually, without releasing the remainder of the assortment, and for returning it to place in the holder after use.

Still a further object is to provide such a holder having a construction which is capable of being readily manufactured and assembled at a relatively low cost.

To these and other ends the invention resides in certain improvements and combinations of parts, all as will be hereinafter more fully described, the novel features being pointed out in the claims at the end of the specification.

In the drawings:

Fig. 1 is a top plan view of a holder for fish hooks embodying the present invention as adapted for holding hooks of the "fly" type;

Fig. 2 is a side elevation thereof;

Fig. 3 is a central sectional elevation thereof, showing the parts adjusted for inserting or removing one of the hooks;

Fig. 4 is a view similar to Fig. 3, but partly broken away and showing the parts adjusted for retaining a hook therein;

Fig. 5 is an enlarged sectional elevation, partly broken away, substantially on the line 5—5 in Fig. 3;

Fig. 6 is an enlarged sectional elevation, partly broken away, substantially on the line 6—6 in Fig. 3;

Fig. 7 is a side elevation of a modified form of holder, for ordinary hooks, embodying the present invention;

Fig. 8 is a top plan view of the modified form shown in Fig. 7 with the parts in hook retaining position;

Fig. 9 is a sectional elevation substantially on the line 9—9 in Fig. 8;

Fig. 10 is a view similar to Fig. 9 but partly broken away and showing the parts adjusted to position for inserting or removing a hook, and Fig. 11 is a top plan view of the body portion of the holder shown in Fig. 7 with the cover portion removed for clearer illustration.

The embodiment of the invention for holding "fly" hooks, shown by way of illustration in Figs. 1 to 6, inclusive, of the drawings, preferably comprises a container, indicated generally at 15, for enclosing and protecting the hooks and holding device. This container comprises a circular bottom portion 16 having a peripheral side wall 17 to which is removably fitted and secured, as by means of screw threads 17a, a top or cap 18, these container parts, and especially the cap 18 being preferably constructed of transparent plastic material through which the contents may be inspected.

The container bottom portion has a bottom wall 19, with an upstanding annular concentric flange part 20 spaced inwardly from its side wall 17, and has also a central upstanding post 21. Rotatably mounted in the post, by means of a screw 22, is a disk-like circular cover plate 23, the periphery of which overlies the top of the wall 20 so as to form a cover part for closing the upper end of the flange 20, as shown.

The top edge of flange 20 and the overlying periphery of the cover part 23 provide concentric cooperating surface portions which are recessed for the reception of the pointed ends of the hooks. To this end, the flange 20 is provided with a recess in the form of a narrow vertical slot 24, opposite which on the bottom wall 19 is a short marker post 25, as a means for visibly indicating the location of the recess. Cover part 23 has its periphery provided with a series of spaced recesses 26 in the form of narrow radial slots corresponding in width to the slot 24 of the flange and adapted to be brought into registry therewith by suitable rotation of cover part 23, as shown in Figs. 3 and 6, to afford an aggregate opening of sufficient size to permit the insertion and removal of the pointed end of a hook, as hereafter more fully explained.

For guiding and maintaining each hook substantially in a radially extending plane, cover member 23 has depending therefrom a series of integrally formed guide lugs 27, one on each side of each of the recesses 26, the lugs being spaced from each other by a distance equal to the width of the slot 26 so as to form an extension of the recess, as shown in Figs. 5 and 6.

It is evident from the above construction that with the cap 18 of the container removed, cover member 23 may be grasped at its edge and rotated to register one of its recesses 26 with the recess 24 in flange 20 on the container bottom, as indicated by the marker post 25. In this position, a hook 28 may have its pointed end inserted radially inwardly through the aggregate opening provided by the registering recesses 24 and 26, as shown in Fig. 3, the snell or shank end of the hook extending radially above the cover member 23, as shown. When the cover part is rotated so that the recess occupied by the hook is no longer in registry with the recess in flange 20 of the bottom, the bent portion of the hook lies in the restricted opening formed only by the cover recess 26 between the cooperating edge portions of the cover and flange 20, so that the flange 20 maintains the bent portion of the hook against removal from its recess. The hook is thus retained against removal and with its shank portion extending radially inwardly on the cover member in full view. This construction is thus particularly adapted for holding hooks of the "fly" type, with their fly portions protected and in full view for selection for removal by rotary adjustment of cover member 23 to position the corresponding recess opposite the recess of the flange 20, as indicated by the marker post 25. The container cap 19 provides further protection for this delicate type of hook, and, when the cap is made of transparent material, as described, the contents of the container are at all times visibly displayed.

The modified construction of holder shown in Figs. 7 to 10, inclusive, is more particularly adapted for holding ordinary hooks, comprising an annular body member 29 with a bottom wall 30 and an open top 31. The upper end of the body member is closed by a disk-like circular cover member 32 rotatably mounted on a pin 33 having its inner end fixed in a bore in a post 34 rising integrally and concentrically from the bottom wall 30.

For receiving and holding the hooks, the upper edge of the annular side wall of the body member is provided with a series of spaced recesses, or notches, 35, providing openings of restricted size between the cooperating edge portions of the side wall and cover member 32. The latter, however, is formed with a recess or notch 36 extending radially inwardly from its periphery and adapted to be brought, by rotation of the cover member, into registry with one of the recesses 35 of the body member, so as to form therewith an aggregate opening of sufficient size to permit the insertion and removal of the pointed end and curved portion of a hook 37, as best shown in Fig. 10. When cover member 32 is rotated so that its recess 36 no longer registers with one of the recesses 35 of the body member, such portions of the hook are securely retained within the annular body member, as shown in Fig. 9.

To guide and maintain each hook substantially in a radially extending plane, the body member has a series of guide lugs 38 extending radially inwardly from the inner surfaces of its side wall, one between each adjacent pair of recesses 35, as shown. These guide lugs are spaced apart a distance equal substantially to the width of the recesses 35, so as to closely guide the pointed end of the hook and so maintain it substantially in its own radially extending plane.

Means are preferably provided for normally retaining cover member 32 with its recess 36 out of registry with any of the recesses 35 of the body part, such means comprising, for example, a rounded boss 39 on the under side of the cover member in position to click over the open upper ends of the hook receiving recesses 35, the cover part being sufficiently resilient to permit of such action of the parts. The periphery of the cover part is preferably knurled or rounded, as indicated at 40, so that it may be readily grasped and rotated for the above purposes.

Body member 29 is preferably formed with strengthening ribs 41, spaced about its circumference and depending below its bottom wall 30, the lower ends of the ribs being connected by a circular skirt 42 having a diameter somewhat enlarged over that of the body member 29, with intervening open spaces 43. These openings are adapted to receive and retain the snell ends of the hooks 37 to prevent them from becoming entangled with other objects.

In the use of this embodiment, relative rotary movement between the cover and body members brings about a registration of the recess 36 of the cover member with one of the series of recesses 35 of the body member to provide an enlarged opening through which a selected hook is detached by upward movement. On release of the cover member, its boss 39 is sprung into registry with one of the recesses 35, by the resilience of the cover member so that the cover recess 36 is no longer in registry with any of the recesses of the body member.

It is evident from the above constructions that the invention provides a holder having a simple, practical and efficient type of construction capable of being economically manufactured of one of the known plastic materials. The holder parts are readily and rapidly adjustable to position for releasing any selected hook, without releasing or disturbing the adjacent hooks. All of the hooks are maintained in individually spaced and separate condition, without any tendency toward entanglement of one with another, and all of the hooks are arranged in a readily visible display in which any desired one may be easily found for use.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A fish hook holder comprising a pair of members connected with each other for relative movement therebetween and having adjacent cooperating surface portions, said portion of one of said members being formed with a series of spaced recesses each providing between said portions an aperture opening continuously to the outside of said holder and of sufficient size to receive and hold the bent portion of a fish hook intermediate its shank and barbed point with its shank extending outside said holder but too small in size to pass the barbed point of the hook, and said portion of the other of said members being formed with a recess adapted by relative movement between said members to be registered with one of said series of recesses of the first mentioned member to afford therewith an enlarged opening of sufficient size to permit the insertion and removal of the barbed point of the hook.

2. A fish hook holder comprising a pair of pivotally connected members having cooperating surface portions concentric with said pivot, said portion of one of said members being formed with a series of spaced recesses providing between said portions an aperture opening continuously to the outside of said holder and of sufficient size to receive and hold the bent portion of a fish hook intermediate its shank and barbed point with its shank extending outside said holder but too small in size to pass the barbed point of the hook, and said portion of the other of said members being formed with a recess adapted by relative movement between said members to be registered with one of said series of recesses of the first mentioned member to afford therewith an enlarged opening of sufficient size to permit the insertion and removal of the barbed point of the hook.

3. A fish hook holder comprising a substantially annular body member and a cover member for one end of said body member, said members having a concentric pivotal connection with each other for relative rotary movement therebetween about said connection and having cooperating annular surface portions concentric with said connection, said portion of one of said members being formed with a series of spaced recesses each providing between said portions an aperture opening continuously to the outside of said holder and of sufficient size to receive and hold the bent portion of a fish hook intermediate its shank and barbed point with its shank extending outside said holder but too small in size to pass the barbed point of the hook, and said portion of the other of said members being formed with a recess adapted by relative rotary movement between said members to be registered with one of said series of recesses of the first mentioned member to afford therewith an enlarged opening of sufficient size to permit the insertion and removal of the barbed point of the hook.

4. A fish hook holder comprising a substantially annular body member and a cover member for one end of said body member, said members having a concentric pivotal connection with each other for relative rotary movement therebetween about said connection and having cooperating annular surface portions concentric with said connection, said portion of one of said members being formed with a series of spaced recesses each providing between said portions an opening of sufficient size to receive and hold the bent portion of a fish hook intermediate its shank and barbed point with its shank extending outside said holder but too small in size to pass the barbed point of the hook, and radially extending guide lugs on said member on opposite sides of each of the recesses of said series for maintaining the points of the hooks in radially extending position, said portion of the other of said members being formed with a recess adapted by relative rotary movement between said members to be registered with one of said series of recesses of the first mentioned member to afford therewith an enlarged opening of sufficient size to permit the insertion and removal of the barbed point of the hook.

5. A fish hook holder comprising a substantially annular body member and a disk-like cover member for closing one end of said body member, said members having a concentric pivotal connection with each other for relative rotary movement therebetween about said connection, the peripheral edge portion of said cover member being formed with a series of spaced recesses each providing between said members an opening of sufficient size to receive and hold the bent portion of a fish hook intermediate its shank and barbed point but too small in size to pass the barbed point of the hook, and the edge portion of said body member being formed with a recess adapted by relative rotation between said members to be registered with one of said series of recesses of said cover member to afford therewith an enlarged opening of sufficient size to permit the insertion and removal of the barbed point of the hook.

6. A fish hook holder comprising a container having a bottom wall and an open top, an upstanding annular flange part on said bottom wall, a disk-like cover part for closing the upper end of said flange part, said parts having a concentric pivotal connection with each other and cooperating annular surface portions, said portion of one of said parts being formed with a series of spaced recesses each providing between said portions an aperture opening continuously to the outside of said holder and of sufficient size to receive and hold the bent portion of a fish hook intermediate its shank and barbed point with its shank extending outwardly of said holder but too small in size to pass the barbed point of the hook, and said portion of the other of said parts being formed with a recess adapted by relative rotation between said parts to be registered with one of said series of recesses of the first mentioned part to afford therewith an enlarged opening of sufficient size to permit the insertion and removal of the barbed point of the hook.

7. A fish hook holder comprising a substantially annular body member and a disk-like cover member for closing one end of said body member, said members having a concentric pivotal connection with each other for relative rotary movement about said pivot, said body member having its edge adjacent said cover member formed with a series of spaced recesses each providing between said members an aperture opening continuously to the outside of said holder and of sufficient size to receive and hold the bent portion of a fish hook intermediate its shank and barbed point with its shank extending outwardly of said holder but too small in size to pass the barbed point of the hook, and said cover member having its edge formed with a recess adapted by relative rotation between said members to be registered with one of said series of recesses of said body member to afford therewith an enlarged opening of sufficient size to permit the insertion and removal of the barbed point of the hook.

8. A fish hook holder comprising a substantially annular body member and a disk-like cover member for closing one end of said body member, said members having a concentric pivotal connection therebetween and cooperating annular surface portions, said portion of said body member being formed with a series of spaced recesses each providing between said portions an opening of sufficient size to receive and hold the bent portion of a fish hook intermediate its shank and barbed point with its shank extending outwardly of said holder but too small in size to pass the barbed point of the hook, said portion of said cover member being formed with a recess adapted by relative rotary movement between said members to be registered with one of said series of recesses of the first mentioned member to afford therewith an enlarged opening of sufficient size to permit the insertion and removal of the barbed point of the hook, and said body member having openings therein spaced axially thereof from said recesses for receiving and retaining the snell ends of said hooks.

HAROLD G. VALENTINE.

REFERENCES CITED

The following references are of record in the file of this patent:

UNITED STATES PATENTS

| Number | Name | Date |
|---|---|---|
| 169,029 | Nauen | Oct. 19, 1875 |
| 1,737,643 | Conner et al. | Dec. 3, 1929 |